US008243316B2

(12) United States Patent
Pangrazio, III et al.

(10) Patent No.: US 8,243,316 B2
(45) Date of Patent: *Aug. 14, 2012

(54) SYSTEM, METHOD AND PRODUCTION TICKETS FOR PRINT MANAGEMENT

(75) Inventors: Donald M Pangrazio, III, LeRoy, NY (US); Anthony J Leone, III, Pittsford, NY (US); Michael J Evan, Webster, NY (US); Connie C He, Los Angeles, CA (US); Nisha Pan, Glendale, CA (US); Yolanda Palomo, Paramount, CA (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/193,913

(22) Filed: Jul. 29, 2011

(65) Prior Publication Data

US 2011/0286045 A1 Nov. 24, 2011

Related U.S. Application Data (63) Continuation of application No. 11/479,693, filed on Jun. 30, 2006, now Pat. No. 8,023,134.

(51) Int. Cl.
*G06F 3/12* (2006.01)
*G06F 9/44* (2006.01)
*G06F 17/30* (2006.01)

(52) U.S. Cl. .................. 358/1.15; 717/170; 707/808
(58) Field of Classification Search ............ 358/1.15
See application file for complete search history.

(56) References Cited

U.S. PATENT DOCUMENTS

| | | | |
|---|---|---|---|
| 5,450,571 A | 9/1995 | Rosekrans et al. | |
| 5,600,762 A * | 2/1997 | Salgado et al. | 358/1.15 |
| 5,718,520 A | 2/1998 | MacKay | |
| 6,078,934 A | 6/2000 | Lahey et al. | |
| 6,092,089 A | 7/2000 | Lahey et al. | |
| 6,154,748 A | 11/2000 | Gupta et al. | |
| 6,493,731 B1 | 12/2002 | Jones et al. | |
| 6,505,219 B1 | 1/2003 | MacLean et al. | |
| 6,526,415 B2 | 2/2003 | Smith et al. | |
| 6,587,217 B1 | 7/2003 | Lahey et al. | |
| 6,708,184 B2 | 3/2004 | Smith et al. | |
| 6,833,925 B1 | 12/2004 | Igoe et al. | |
| 6,917,437 B1 | 7/2005 | Myers et al. | |
| 6,965,445 B2 | 11/2005 | Dimperio et al. | |
| 6,973,274 B2 | 12/2005 | Kanamoto et al. | |
| 7,286,250 B2 | 10/2007 | Kujirai et al. | |
| 7,580,943 B2 * | 8/2009 | Sakura et al. | 1/1 |
| 7,612,921 B2 | 11/2009 | Okabe et al. | |
| 7,876,465 B2 | 1/2011 | Matsueda | |
| 2002/0078083 A1 | 6/2002 | Armstrong | |
| 2004/0109191 A1 | 6/2004 | Ohshima | |
| 2004/0193465 A1 | 9/2004 | Sangroniz et al. | |
| 2004/0257612 A1 | 12/2004 | Okabe et al. | |

(Continued)

*Primary Examiner* — Marivelisse Santiago Cordero
*Assistant Examiner* — Mesfin Getaneh
(74) *Attorney, Agent, or Firm* — Alix, Yale & Ristas, LLP (57) ABSTRACT

Disclosed herein is a method of preparing production tickets that involves selecting order data from at least a first data field in an ordering system, feeding the selected order data to a workflow management system, and generating a production ticket for a print production job using at least a portion of the selected order data to name the print production job. One embodiment employs a join identifier to include several related files on the same production ticket. Corresponding configuration tools and workflow management systems also are disclosed.

7 Claims, 7 Drawing Sheets

U.S. PATENT DOCUMENTS

| | | |
|---|---|---|
| 2005/0036692 A1 | 2/2005 | Iida et al. |
| 2005/0050466 A1 | 3/2005 | Sangroniz et al. |
| 2005/0162667 A1* | 7/2005 | Felix et al. .................... 358/1.1 |
| 2006/0187484 A1* | 8/2006 | Noda .......................... 358/1.15 |
| 2007/0005561 A1 | 1/2007 | Sakura et al. |
| 2007/0133048 A1 | 6/2007 | Nakaya et al. |

* cited by examiner

| PROCESS MANAGER (5.0) BILL OF MATERIALS 07:00:00 11/29/2005 Page 1 of 1 ||
|---|---|
| Customer's Internal Number :123460 | Event: MAKE |
| PO Number: 1001 | Host: ProcessMgr2 |
| Rush: NO | Due Date: 11/20/2005 |
| 123460.HowToGuide.Stockcover.pdf (as a barcode, shown here as text) ||
| Job Name: 123460.HowToGuide.Stockcover.pdf ||
| Title: How To Guide ||
| Part Number: 77777 ||
| Quantity: 3 ||
| Item Input Status (IsValidItem) : READY \| Malformed \| File Not Found \| etc. ||
| Prod. Method: 6x9-COVERS ||
| Workflow ID: 8, Workflow Name: 6x9-covers ||
| File Join Key: JoinKeyValue ||
| File Name: \\processmgr\mountpt\Shared\ProdReady\CustomerA\BookFiles\TOC.pdf<br>File Name: \\processmgr\mountpt\Shared\ProdReady\CustomerA\BookFiles\Ch1.pdf<br>File Name: \\processmgr\mountpt\Shared\ProdReady\CustomerA\BookFiles\Ch2.pdf<br>File Name: \\processmgr\mountpt\Shared\ProdReady\CustomerA\BookFiles\App.pdf ||
| Custom Field 1:<br>Custom Field 2:<br>Custom Field 3:<br>Custom Field 4:<br>Custom Field 5:<br>Custom Field 6:<br>Custom Field 7:<br>Custom Field 8:<br>Custom Field 9:<br>Custom Field 10: ||

FIG. 7

SYSTEM, METHOD AND PRODUCTION TICKETS FOR PRINT MANAGEMENT

This is a continuation of U.S. application Ser. No. 11/479,693 filed Jun. 30, 2006, now U.S. Pat. No. 8,023,134 issued Sep. 20, 2011.

BACKGROUND

The embodiments disclosed herein are directed generally to print management, and more specifically to the creation and/or use of production tickets in managing high volume printing operations.

Commercial print shops often have different computerized systems for handling different parts of the ordering and printing processes. Typically, a Management Information System (MIS) contains information on books or other publications that are available to be ordered. An Order Management System enables a particular book to be ordered. A Production Management System receives and schedules orders for printing and/or pick-up of existing inventory. A Fulfillment system handles the printing and packaging process. Some print shops track orders as they move through the various systems using hand written production tickets, or production tickets that are partially printed by the ordering system and then completed by hand. The use of production tickets is beneficial to the fundamental task of completing prepress and production operations on an order that is received. Prepress operations include color management, font checking, image resolution checking, imposition, soft proofing, e-mail notification, job ticketing, file conversion etc. and may include submission to a printing system or archiving in a repository.

Various methods have been developed for computer-generating job tickets in a printing environment. As is described in U.S. Pat. No. 6,965,445, assigned to Xerox Corporation, computerized job tickets are used to direct an imaging system to produce a designated number of a particular document or set of documents in a particular format or style, such as, for example, simplex (single-sided) or duplex (double-sided), and/or with designated image processing procedures applied to the document. Accordingly, a document is created as specified in the job ticket associated with the document. U.S. Pat. No. 6,965,445 describes the use of individual job tickets for printers, copiers or imaging devices. The individual printing, copying or imaging parameters may be varied or manipulated by changing the parameters on any job ticket. The '445 patent discloses the combination of a job ticket with a document file containing, within its file name, user-supplied parameters such as the desired number of copies and percent magnification/reduction. The system described in the '445 patent enables a single pre-configured job ticket to be customized for use in combination with many different document files.

It would be useful to develop an improved system and method of automatically preparing production tickets using information from several different computer systems.

SUMMARY

One embodiment is a method comprising selecting order data from at least first and second data fields in an ordering system, feeding the selected order data to a workflow management system, and generating a production ticket for a print production job using at least a portion of the selected order data to name the print production job. Sometimes the method further comprises generating a print production job using the production ticket. Often, the selected order data also includes data from a second data field in the ordering system.

The job name can be a compound name. The compound name sometimes includes both selected order data from the ordering system and data originating in the workflow management system. The selected order data usually includes at least one of the order number, part identifier, publication identifier and file name. The selected order data sometimes includes multiple file names on a single production ticket.

In some cases, the first data field comprises a join identifier. Files sharing the same join identifier usually appear on the same production ticket, and often can be printed as collated sets. In some embodiments, data in at least the first data field is manipulated before being output on the production ticket.

Another embodiment is a method comprising naming at least one file on a production ticket with a compound name having a first field including characters indicative of the order number and a second field including characters indicative of at least one of a job title, a file name, and a part identifier, the compound name associating the production ticket with both an ordering system and a workflow management system, the ordering system and the workflow management system recognizing different text strings of the compound name.

A further embodiment is a computerized configuration tool comprising a user interface enabling selection of at least one data field in an ordering system to be associated with at least one data field in a workflow management system, a memory for storing association instructions, and a processor for feeding associated data from the ordering system to the workflow management system. The data fields include title identification information to be included on a production ticket. In some cases, the processor is configured to manipulate data from the ordering system to conform to the format of the print production ticket. Often, the processor is configured to join multiple files containing the same join identifier for inclusion on a single print production ticket.

Yet another embodiment is a workflow management system comprising a computerized configuration tool accessible through a user interface. When applied, the configuration tool enables selected data to be fed from a title ordering system to a workflow management system and to be output on a production ticket as part of a job name used in generating a print production job.

A further embodiment is a method comprising selecting order data from at least first and second data fields in an ordering system, the first data field comprising title identification data and the second data field comprising a join identifier, feeding the selected order data to a workflow management system, and generating a production ticket, wherein files containing the same join identifier appear on the same production ticket.

Another embodiment is a workflow management system comprising a computerized configuration tool accessible through a user interface. The configuration tool, when applied, enables selected data to be fed from an ordering system including title identification information to a workflow management system and to be output on a production ticket. The configuration tool includes a join identifier for including multiple files on the same production ticket. The production ticket refers to a single print production job comprising the multiple files.

DETAILED DESCRIPTION

The systems and methods disclosed herein allow production tickets to be more efficiently created and used and result in a reduction in print errors. By providing for custom mapping of the data feed from the MIS or Order Management System into the production tickets and the production print jobs, manual entries can be eliminated, and tracking errors for orders as they progress through the ordering and production systems can be minimized.

Generally stated, certain embodiments described herein transfer one, two or more fields of data from one system to another system in a print production environment. These various data fields can be combined to form a single job name and can be used to identify a particular print job as it proceeds through the production environment.

As used herein, "order data" refers to information pertaining to a particular order for a specific book or other title. Non-limiting examples of order data include one or more of the following: title name, file name(s), order number, production method, part identifier, quantity, due date, bar code value, rush status, font type, font size and join information. An "ordering system" as used herein is a management information system (MIS) which contains a record of what titles can be ordered and/or an order management system that makes titles available to be ordered.

As used herein, a "workflow management system" is a system that automates the processing of orders received from an ordering system. A "production ticket" as used herein refers to a bill of materials, which is a document that identifies a particular order. The order may comprise a single file or a group of files. A "print production job" is a job that is described on a production ticket.

"Compound name" as this term is used herein refers to a file name that contains two or more terms, each of which can be used to identify the order. A "publication identifier" is a publication name, such as a title, a number such as an ISBN number, or another set of characters that identifies a publication. A "join identifier" is a set of characters that indicates to the workflow management system which line items (files) are to be combined. The line items within an order that have the same join identifier get combined together. As used herein, a "join key" is the value in the join identifier field. A "part identifier" is an alphanumeric identifier associated with a portion of an order. A part identifier can refer to an individual file or a set of related files.

As used herein, the term "printer" encompasses any apparatus, such as a digital copier, bookmaking machine, facsimile machine, multi-function machine, etc. that performs a print outputting function for any purpose. A "print server" is a computer that manages one or more printers, and a "file server" is a computer and storage device that stores files.

Figure 1:
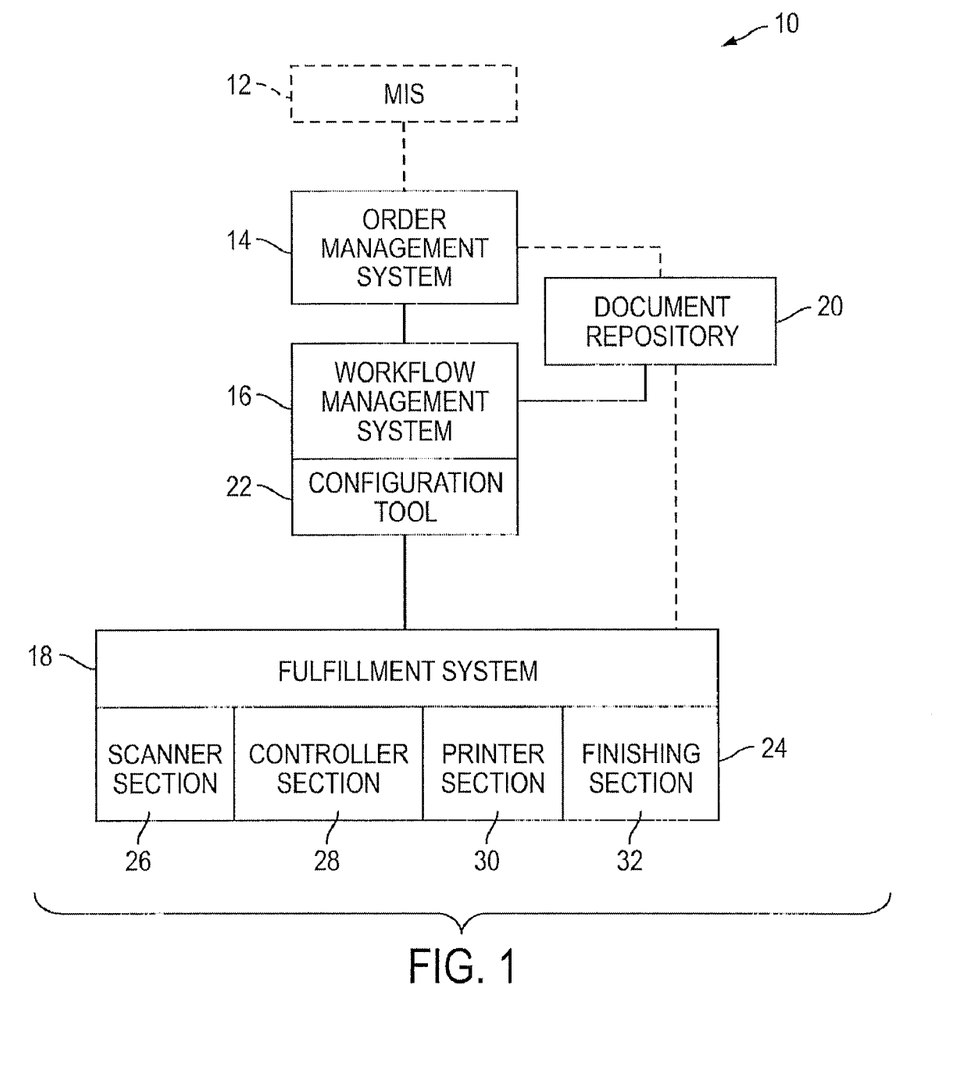
FIG. 1 schematically depicts an example of a print shop.

Referring to the figures and first to FIG. 1, a print shop 10 configured in accordance with an embodiment disclosed herein is schematically shown. The print shop 10 includes an optional MIS 12, an order management system 14, a workflow management system 16, a fulfillment system 18 and a document repository 20. The MIS 12 and order management system 14 may be combined as a single system. The MIS 12 and/or Order management system 14 system hold data and information, some of which is needed in order to fulfill a print job. The workflow management system 16 generates production tickets for the order's line items as they are processed through the prepress workflows. The Fulfillment System 18 includes an imaging device 24. The imaging device 24 may include a scanner section 26, a controller section 28, a printer section 30, and in some cases a finishing section 32. The controller section 28 typically includes one or more of a user interface, an interactive touch screen display, a keyboard and a mouse. The finishing section typically includes equipment to stitch, stable, bind or otherwise provide a finishing operation to documents that are output from the printer section 30.

A configuration tool 22, which is usually part of the workflow management system 16, provides for movement of data between the order management system and other systems. The configuration tool 22 can be configured to provide for movement of data between the order management system and one or more of the workflow management system 16, the fulfillment system 18 and the document repository 20.

Figure 2:
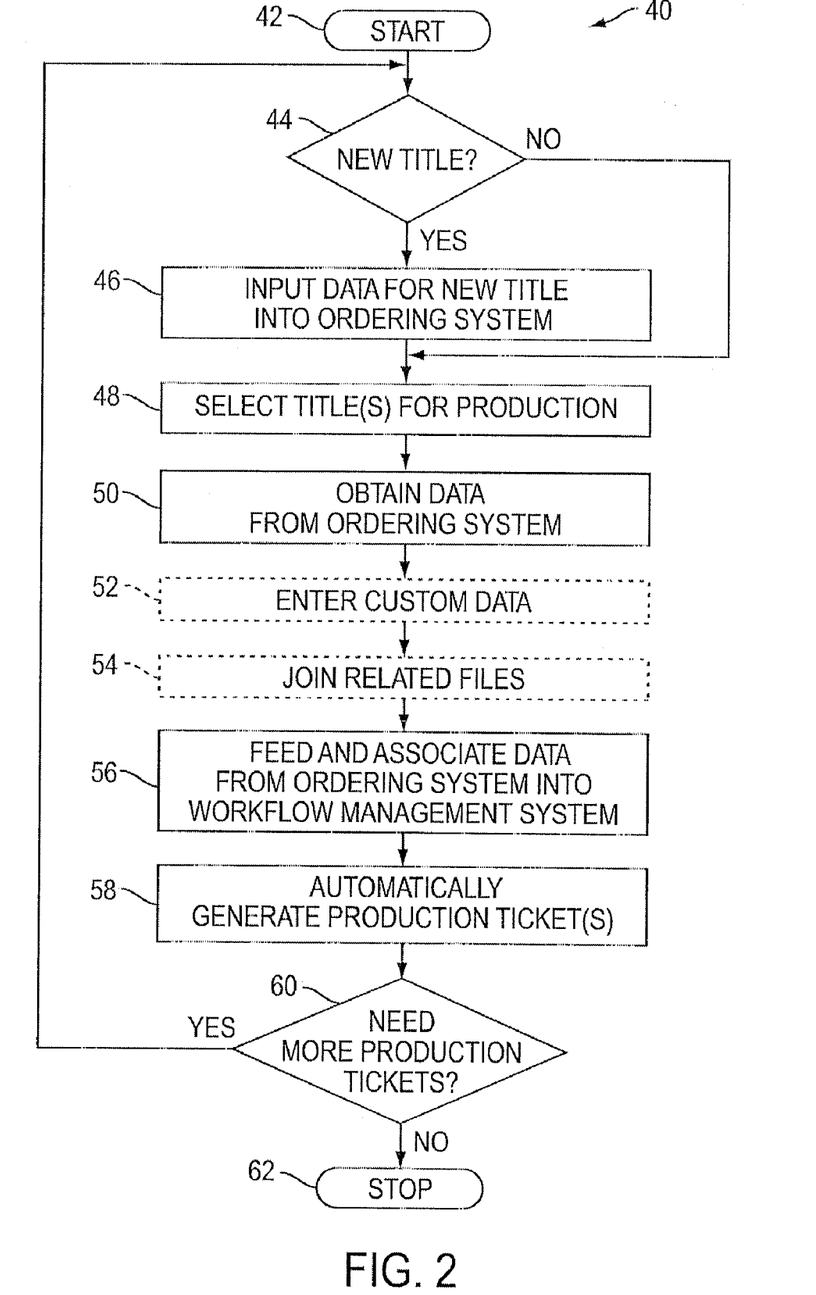
FIG. 2 is a flow sheet showing a method according to one embodiment disclosed herein.

FIG. 2 is a flow sheet depicting a method of integrating different computer systems in print shop ordering and production. The overall flow sheet is designated as 40. The method starts at 42. First, a determination is made at 44 as to whether data is to be entered for any new titles. If so, data for the new titles is input at 46 into an ordering system. In one exemplary embodiment, the operator prepares an Order Jacket File which contains information about each individual file that is affiliated with a particular title. The Order Jacket File becomes part of an ordering system database of information about the available titles. After any new title information has been entered, one or more titles are selected for production at 48. Next, selected data is obtained at 50 to be mapped and fed to the workflow management system. Typically, this data would include information such as order number, part number, title name, file names associated with the title, and production method. Other information typically included is event type, folder name, file join terms, copy quantity, purchase order number, rush status, due date, barcode data, font type and font size. Any custom data is then entered at 52. If a group of files are to appear on a single production ticket, the files are joined by a suitable method, such as using the same join key for each file at 54.

The data obtained and/or entered in the ordering system at 50, 52 and 54 is then fed to and associated into the workflow management system at 56. A production ticket containing the fed and associated data, and sometimes also other data, is then automatically generated at 58. Use of compound file names on the production ticket that describe the nature of the documents stored under a particular name help to keep track of multiple files that are all part of a particular title. A determination is made at 60 as to whether additional production tickets are needed. If so, the process is repeated by returning to 44. If not, the process stops at 62.

As indicated above, in some cases, custom data is entered and associated at 52 in order, for example, to reconcile the use of two different names for a particular data field in two different computer systems. If an ordering system has a field named "Order Number" and a workflow management system has the same data in a field labeled as "Customer's Internal Number," these two fields can be associated by entering the name to be used on the production ticket in response to an appropriate prompt.

In some cases, as indicated above, related files are joined at 54, such as by using a join key, to put several files that are to be collated as part of a single production job on a single production ticket. The advantage of the use of a single production ticket is that collation of multiple files together occurs automatically, and fewer production tickets are required to track a single title as the different sections of the title are produced.

Figure 3:
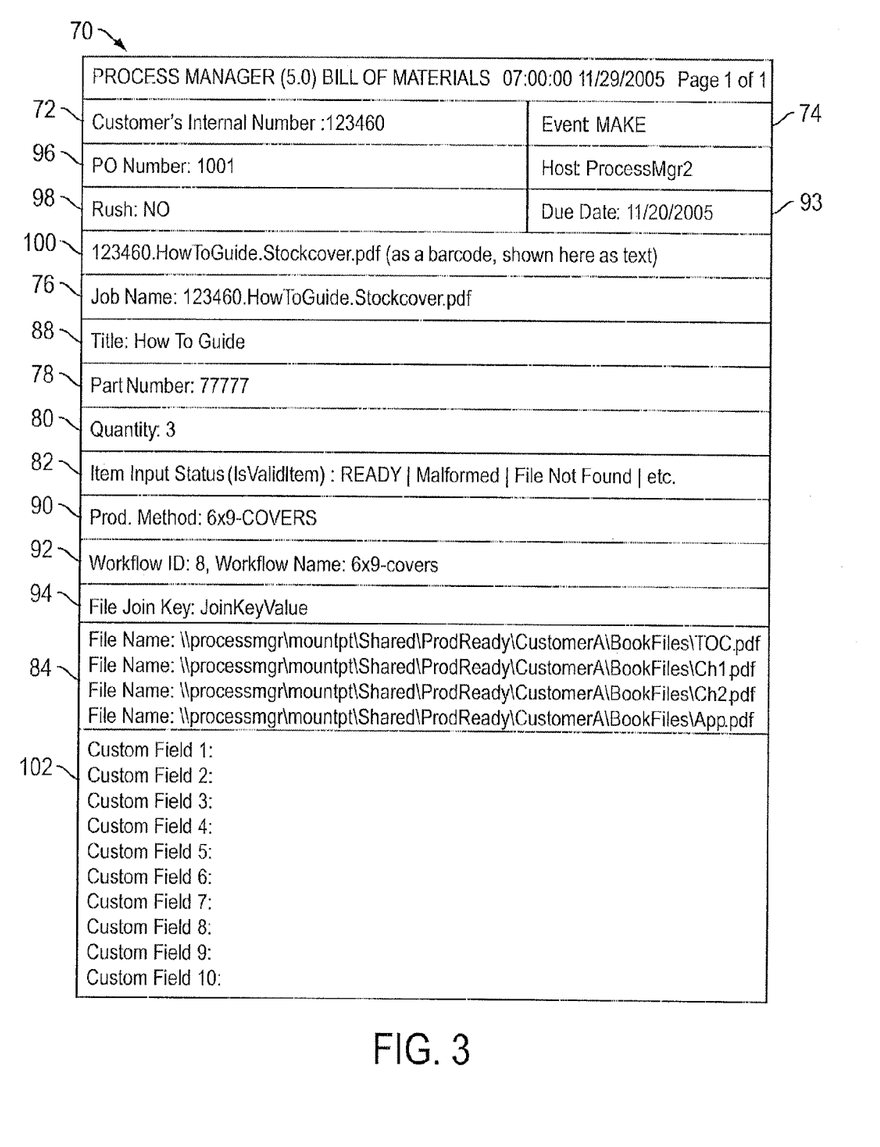
FIG. 3 shows an exemplary production ticket.

An example of a bill of materials, also known as a production ticket, is shown in FIG. 3 and is designated as 70. The production ticket 70 is created by an operator automatically in order to track a job as it moves through the order and production environment. Production tickets typically provide at least the following information: the customer's internal number at 72, the intended event at 74, the print job name at 76, the part identifier or part number at 78, the quantity at 80, the input status at 82, and the one or more file names at 84. Additional information that advantageously can be included is one or more of the following: the product title at 88, the production method at 90, the workflow ID and name at 92, the due date at 93 and any applicable join key value at 94. Further information also can include at least one of the purchase order number at 96, rush status at 98, a barcode at 100 and any of a number of custom fields at 102. The production ticket of FIG. 3 shows that four files are joined by a join key. In particular, the four files that are to be printed and collated as a single set are TOC.pdf, CH1.pdf, Ch2.pdf, and App.pdf.

In order to reduce input and tracking errors, a composite production job name can be created using terms acquired from different document management and handling systems that process a particular document. For example, when the order management, document repository, production management and fulfillment systems constitute two, three or four separate and discrete computer systems, a composite job name can be created on the production ticket using data taken from different computer systems and combined into a single job name. This enables automatic generation of most of the data on the production ticket, thereby improving efficiency and reducing the likelihood of data entry errors. When the production ticket 70 is printed, the operator has the information that the production supervisor configured the system to include on the production ticket 70. When the operator releases the print job, such as though a computer that operates a printer, the job name can be identified based upon the name assigned by the production supervisor.

As indicated above, in some embodiments, the order management system designates a join key within an order. Line items of an order that are to be joined, such as different files that are part of the same title, share the same join key. A join key can be used to combine the line items (files) in order that they can be printed as collated sets. In many cases, the optional join key causes the combination of line items so that they can be combined throughout the production cycle.

Figure 4:
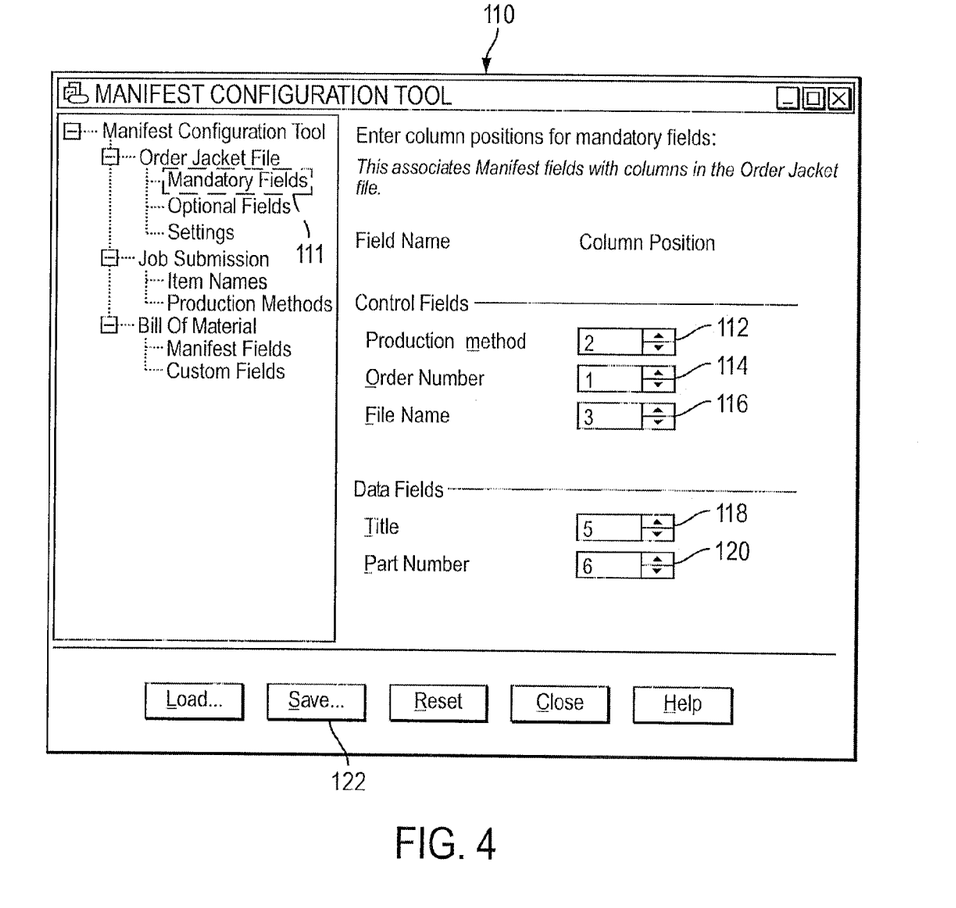
FIG. 4 shows an example of a screen display for associating data between two different systems.

FIG. 4 shows an example of a screen display of what are likely to be considered mandatory data fields in a user interface designed to produce production tickets such as that of FIG. 2. The screen display is designated as 110. The screen display 110 has a mandatory fields selection 111 that provides a screen display that gives the user with an opportunity to specify which of the mandatory data fields from an Order Jacket File are to appear on a production ticket. In this particular embodiment, the five data fields are the production method field 112, order number field 114, file name field 116, title field 118 and part number field 120. The user enters data regarding the column location of this information and then saves it using the save button 122.

Figure 5:
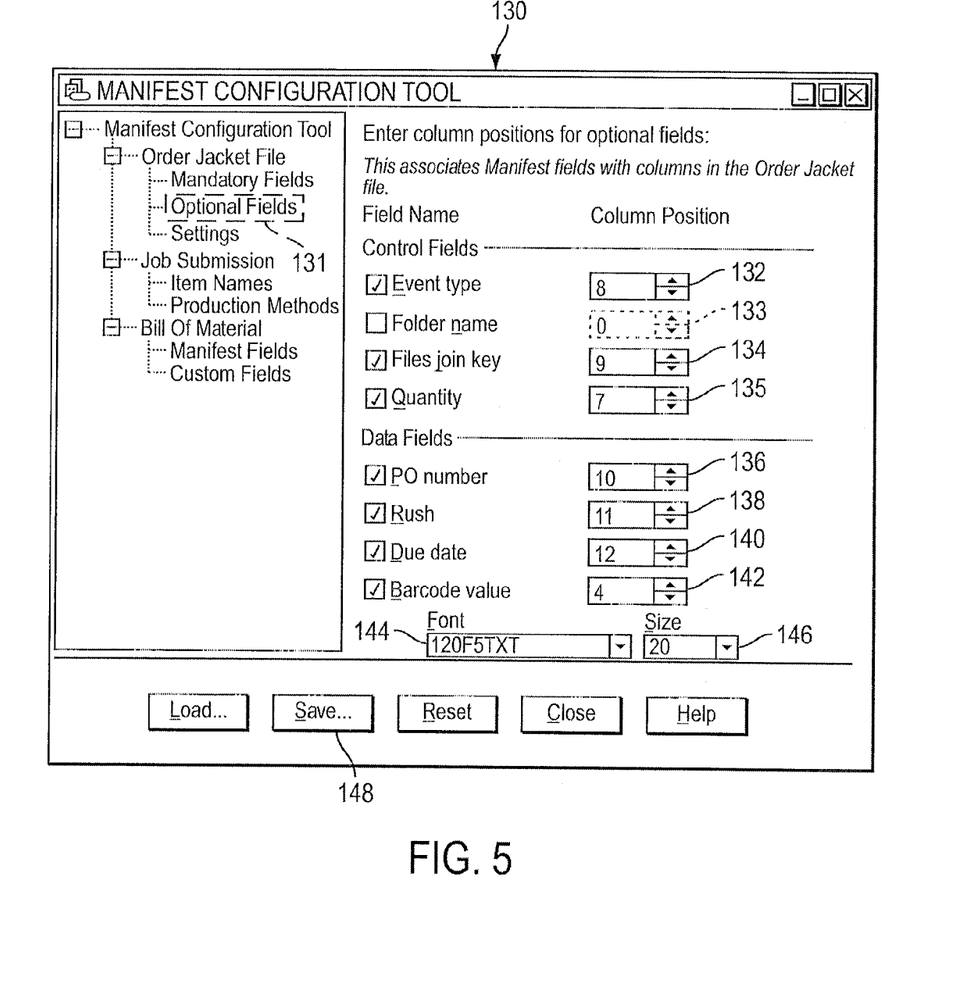
FIG. 5 shows an example of a screen display for entering optional data to be associated between two different systems.

FIG. 5 shows an example of a screen display of optional data fields that can be part of a user interface designed to produce production tickets. Some of these fields may not be used by the order management system. The screen display, designated as 130, has an optional fields selection 131 that provides the user with an opportunity to specify which of the optional fields from the Order Jacket File are to appear on the production ticket. In the embodiment that is shown, there are ten data fields, including event type at 132, folder name at 133, files join key at 134, quantity at 135, purchase order number at 136, rush status at 138, due date at 140 and barcode value at 142. This screen display also shows the barcode font type at 144 and the barcode font size at 146. The user enters data regarding the column location of at least some of this information and saves it using the save button 148.

As indicated above, the files join key enables multiple files that are part of a single title to be included on a single production ticket. The matched items are joined and submitted as one file, allowing them to be printed as a collated set. Each file within a set joined by a join key has the same value in the files join key field.

Figure 6:
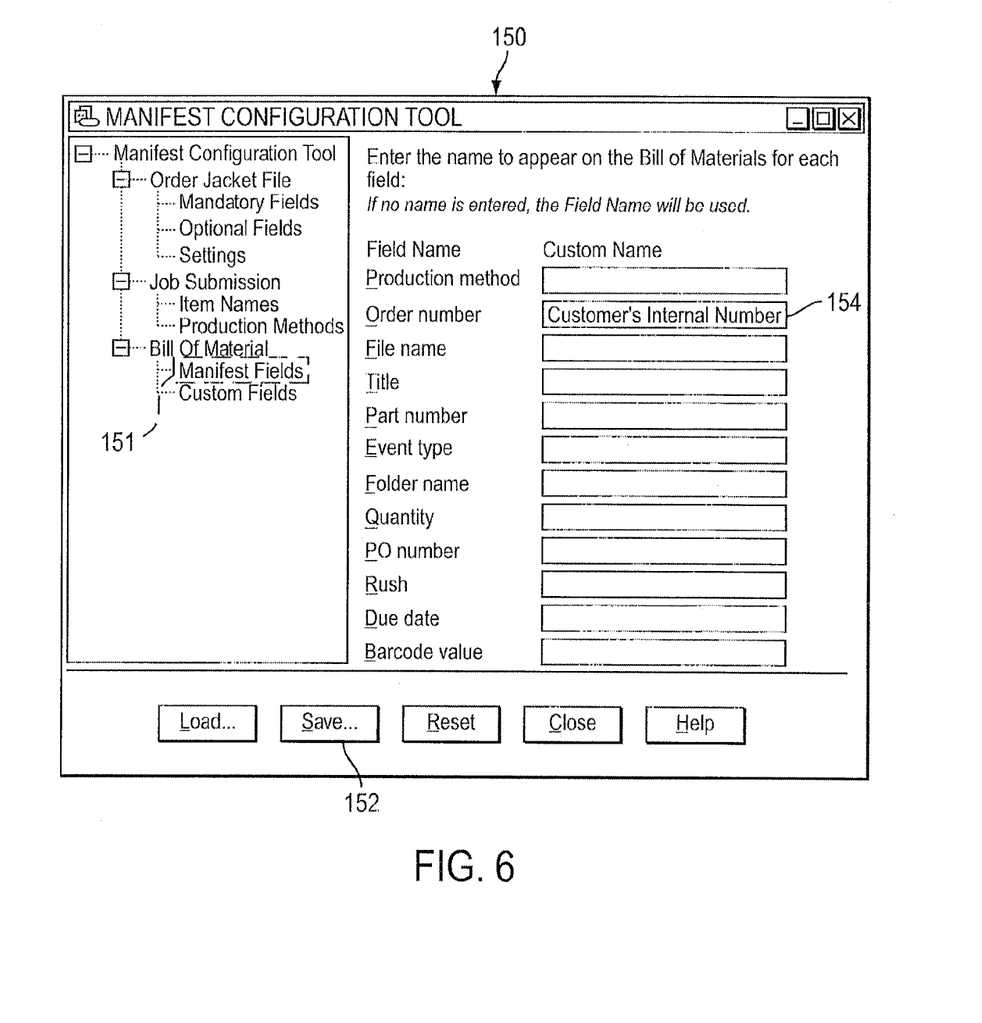
FIG. 6 depicts a screen display for associating the data that appears under two different names in two different systems.

FIG. 6 shows an example of a screen display 150 for a user interface that associates names or terms used in one computer system, such as an order management system, with the names or terms used in another system, such as a workflow management system that prints production tickets. This enables data to be fed from a first system, such as an order management system, to a second system, such as a workflow management system, and utilized in a specified manner while maintaining the original nomenclature that the personnel can relate to. The default names to be used on the production ticket are the field names that correspond to the fields shown on the screen displays of FIGS. 4 and 5. The user can choose a manifest fields selection 151 to display a screen for association of different names. For any name that is to be displayed differently, e.g. as a "custom name," the user enters the custom name beside the field name and saves it using the save button at 152. For example, in FIG. 6, the field labeled as "Order number" in FIG. 4 has been renamed as Customer's Internal Number at 154.

Figure 7:
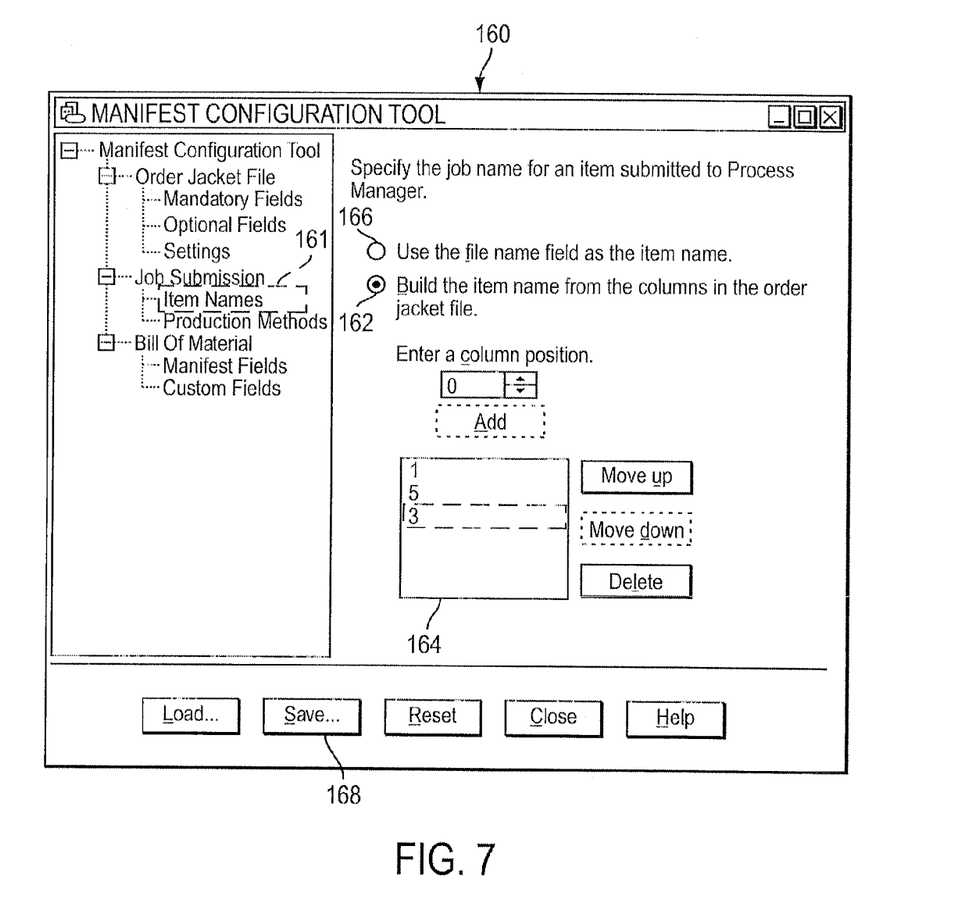
FIG. 7 shows a screen display to be used in creating compound file names.

FIG. 7 shows a screen display 160 that enables a user to build a descriptive job name for a production ticket by automatically combining multiple fields to create a compound job name, such as OrderNumber.Title.FileName. This type of descriptive job name helps to identify the job as it proceeds through the production environment. For example, the job name can be used to associate the individual files that are used to make a book, such as one with a hard color cover and black and white text. It also can be used to associate multiple books or other titles that are part of the same order. In the example shown in FIG. 7, selection of "item names" at 161 provides a screen display from which a job name is built using multiple fields from the Order Jacket File. Option button 162 provides for the building of an item name from information contained in particular columns in the order jacket file. In the Example that is illustrated, these fields are from columns 1, 5 and 3. As shown in FIG. 4, columns 1, 5 and 3 contain Order Number, Title and File Name, respectively. As shown in FIG. 7 at box 164, a job name is built from columns 1, 5 and 3 and therefore contains the Order Number, Title and File Name. Another option available from the screen display 160 is to "use the file name field as the item name" by selecting the appropriate option button at 166. The selections made in the configuration tool can be saved using the save button 168.

A non-limiting example of Order Number 123460 for Title "HowToGuide" as it proceeds through a MIS system, Order Management System, Production Management System and Fulfillment System is to name the files that are part of this job as 123460.HowToGuide.CCover.pdf, 123460.HowToGuide.TOC.pdf, 123460.HowToGuide.Ch1.pdf, 123460.HowToGuide.Ch2.pdf, etc. In some cases there is a separate production ticket for each file. In other cases, such as when a join identifier is used to join related files, files for a particular title that are to be collated together and printed on the same printer can appear on the same production ticket.

Using the methods and systems disclosed herein, related files that are part of a single title or a single order can be efficiently tracked and printed or stored. The systems and methods are useful in avoiding data entry errors when different computer systems are used for ordering and production.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, or a combination of both.

What is claimed is:

1. A method comprising:
    selecting order data from at least a first data field in an ordering system on a computer, the order data including multiple files comprising a single order,
    feeding the selected order data to a computerized workflow management system including a configuration tool that receives user input regarding data to be moved between the ordering system and the workflow management system, and receives user input regarding data to be moved between the workflow management system and a fulfillment system,
    computer-generating a single, integrated production ticket for a print production job including the multiple files, the production ticket including at least a portion of the data moved between the ordering system and the workflow management system based on use of the configuration tool, and
    fulfilling the print production job using the instructions on the single, integrated production ticket,
    wherein at least a portion of the selected order data is used to name the print production job,
    wherein the print production job name is a compound name, and
    wherein the compound name includes both selected order data from the ordering system and other data communicated to the workflow management system.

2. The method of claim 1, wherein the selected order data also includes data from at least a second data field in the ordering system.

3. The method of claim 1, wherein the compound name includes both selected order data from the ordering system and data from the fulfillment system.

4. The method of claim 1, wherein the selected order data includes at least one of the order number, publication identifier and file name.

5. The method of claim 1, wherein the selected order data includes at least two of the order number, publication identifier and file name.

6. The method of claim 1, wherein the selected order data includes multiple file names on the single, integrated production ticket.

7. The method of claim 1, wherein the configuration tool comprises a user interface for a computer enabling selection by the user of the data to be moved between the ordering systemand the worklow management system, and enabling selection by the user of the data to be moved between the workflow management system and the fulfillment system.

* * * * *